3,080,342
ETHER TERMINATED POLYCARBONATES
Lieng-Huang Lee and Henno Keskkula, Midland, Mich., assignors to The Dow Chemical Company, Midland, Mich., a corporation of Delaware
No Drawing. Filed May 31, 1960, Ser. No. 32,614
7 Claims. (Cl. 260—47)

This invention relates to new and improved polycarbonate resins. More particularly it relates to high molecular weight polycarbonate resins having improved properties especially with regard to thermal stability and ease of fabrication.

It is known that polycarbonate resins can be made which have exceptional strength and outstanding toughness. However, these resins are difficult to fabricate from a melt thereof because they have very high viscosities at temperatures slightly above their melting points. It has been suggested that this difficulty can be overcome by fabricating high molecular weight polycarbonate resins at temperatures substantially above their melting points. When, however, a polycarbonate resin is heated to a temperature substantially above its melting point in order to fabricate it at a lower viscosity the polymer degrades and the resultant products have considerably reduced values for strength, toughness, heat resistance, transparency and other desirable properties.

It is among the objects of this invention to provide new and improved polycarbonate resins.

A further object of this invention is the provision of such polymers which can easily be fabricated from melts thereof into shaped articles.

A particular object of the present invention is the provision of high molecular weight polycarbonate resins which are thermally stable and have low melt viscosities.

Other objects and advantages of the present invention will be evident in the following description.

It has now been discovered that high molecular weight polycarbonate resins having certain terminal groups on the polymer chains have improved properties, particularly low melt viscosity and a high thermal stability. According to the present invention polycarbonate resins having terminal groups obtainable by removing the hydroxyl hydrogen from certain glycol ethers have low viscosities at temperatures above their melting points and high thermal stability.

The glycol ethers that can be used as terminators to form the resins of the present invention are monohydroxy compounds corresponding to the formula

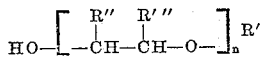

in which R' is a hydrocarbon radical having from 1 to 12 carbon atoms and is free of aliphatic unsaturation, R" and R''' are independently selected from the group consisting of H methyl and ethyl, and the sum of the carbon atoms in R" and R''' is from 0 to 2, and $n$ is a positive integer from 1 to 3. Representative examples of compounds suitable as chain terminators in accordance with the present invention are ethylene glycol methyl ether, ethylene glycol phenyl ether, ethylene glycol ethyl ether, ethylene glycol n-butyl ether, diethylene glycol methyl ether, diethylene glycol ethyl ether, diethylene glycol n-butyl ether, propylene glycol methyl ether, dipropylene glycol methyl ether, dipropylene glycol n-butyl ether, tripropylene glycol methyl ether, ethylene glycol t-butyl ether, ethylene glycol cyclohexyl ether, ethylene glycol nonyl ether, ethylene glycol dodecyl ether, propylene glycol phenyl ether, propylene glycol n-butyl ether, propylene glycol dodecyl ether, diethylene glycol undecyl ether, dipropylene glycol cyclohexyl ether, tripropylene glycol t-butyl ether, tripropylene glycol octyl ether, tri- ethylene glycol heptyl ether, butylene glycol pentyl ether, dibutylene glycol ethyl ether, and tributylene glycol isopropyl ether. Mixtures of these glycol ethers, for example, a mixture of propylene glycol methyl ether, dipropylene glycol methyl ether and tripropylene glycol methyl ether, can be used.

The carbonate polymers of the present invention are represented by the formula

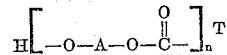

in which —O—A—O— represents the divalent residue which can be obtained by the removal of hydroxyl hydrogens from an organic dihydroxy compound free of aliphatic unsaturation, T represents the monovalent residue which can be obtained by the removal of reaction hydrogen from a chain terminator of the present invention and $n$ is a positive integer greater than 20 and preferably greater than 40.

The divalent residue can be obtained from a glycol such as ethylene glycol, tetramethylene glycol, hexamethylene glycol, 1,4-dihydroxy cyclohexane, and decamethylene glycol. Preferably, however, the divalent residue —O—A—O— is obtained from compounds represented by the formula HO—Ar—B—Ar'—OH and forming polymers represented by the formula

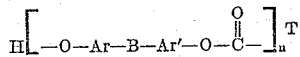

in which Ar and Ar' are divalent benzene nuclei, that is, phenylene and substituted phenylene, and B is a divalent aliphatic or cycloaliphatic radical, oxygen or sulfonyl. Preferably, B is alkylidene or cycloalkylidene, that is, Ar and Ar' are joined to the same carbon atom of the B radical. Ar and Ar' are preferably linked into the polymer chain at the 1 and 4 positions, the 4 positions being linked to B and the 1 positions being linked to oxygen in the polymer chain. When Ar and Ar' are further substituted, the substituents are preferably in the 2 and/or 6 positions. Illustrative examples of the B portion of the polymer in the above formula when B is alkylidene are methylene, ethylidene, propylidene, isopropylidine, 2,2'-butylidene, 4-methyl-2,2-butylidene, and cyclohexylidene. Representative examples of Ar and Ar' substituents are methyl, ethyl, isopropyl, 2-tertiary-butyl, phenyl and chloro.

The organic dihydroxy compound is preferably a diphenol, especially an alkylidene diphenol. Representative examples of alkylidene diphenols useable as a base material for making polycarbonate resins of this invention are 4,4'-isopropylidene orthocresol, 4,4'-isopropylidenebis(2-phenylphenol) and 4,4'-isopropylidenebis(2,6-dichlorophenol). Other diphenols such as 4,4'-sulfoxyldiphenol and 4,4'-oxydiphenol can be used in making the polymers of this invention. The organic dihydroxy compound used to make the chain terminated polycarbonate resins of this invention can be a pure compound or a mixture of such compounds. T is a monovalent radical formed by the reaction of a chain terminator of this invention with an end group. When Ar and Ar' are both 1,4-phenylene, the polymer has recurring units corresponding to the structure:

and when in addition B is isopropylidene, the polymer of this invention has a structure corresponding to the formula

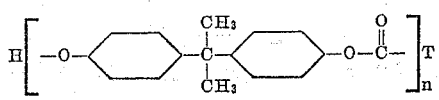

in which T is a radical obtained from the chain terminator. Subscript $n$ is a positive integer greater than 20 and preferably greater than 40.

The polymers of this invention can be made by modifying known techniques for making polycarbonate resins such as by the phosgenation of organic dihydroxy compound or by the reaction of an organic dihydroxy compound with a bischloroformate, such modification comprising the addition of a chain terminator of this invention to the reaction mixture.

The following examples are illustrative of the invention but the invention is not limited thereto.

*Example I*

To a solution of 250 grams of sodium hydroxide dissolved in 3 liters of water there are added with stirring, 570 grams of 4,4'-isopropylidenediphenol and 2.5 liters of methylene chloride. The resulting mixture is poured into a 10 liter three-mouthed flask. The flask and contents are placed in a constant temperature bath maintained at a temperature of between 26° C. and 27° C. The contents are stirred vigorously and phosgene gas is led into the flask below the surface of the liquid through a sintered glass tube until an end point at a pH of 7 is reached. To 1/10 part of the emulsion thus formed is added 2.5 mole percent, based on 1/10 part of the 4,4'-isopropylidenediphenol previously added, of dipropylene glycol mono-n-butyl-ether. There is then added a solution containing 75 milliliters of water, 9 grams of sodium hydroxide and 2 grams of 4,4'-isopropylidenediphenol. Stirring is continued for 1 hour and 1 milliliter of a 65 percent aqueous solution of benzyltrimethylammonium chloride is then added as a catalyst. The resultant emulsion is again stirred until it separates into two layers. The supernatant water is decanted and most of the methylene chloride is then volatilized by heating the solution. The viscous mass thus obtained is put on a glass plate, air dried overnight and then further dried in a vacuum oven at a temperature of between 110° C. and 120° C. The product is a dense solid polymer. A melt of this polymer at 290° C. is transparent and has a very light tint at 340° C. (Unsatisfactory polycarbonate resins decompose or darken considerably at these temperatures.) This chain terminated polycarbonate resin has a melt viscosity at 310° C. of 664 poises obtained using the equipment and technique described by Karam et al. in "A New Melt Viscometer," Modern Plastics, volume 32, number 7, March 1955, at a shearing stress of 700,000 dynes per square centimeter. This polymer has a K value of 57. K is equal to 1,000 $k$ and $k$ is calculated from the Fikentscher equation.

$$\log N_r = \left[\frac{75k^2}{1+1.5kc} + k\right]c$$

wherein $N_r$ is the viscosity of a solution of the sample relative to the viscosity of the solvent and $c$ is the concentration of the sample in the solution. The solvent used in this test is dioxane. The polymer obtained in this example has excellent thermal stability. Its viscosity decrease after being held at 310° C. for 30 minutes is very slight.

*Example II*

The procedure of Example I is repeated using the same materials and proportions except that 2.5 mol percent, based on the 4,4'-isopropylidenediphenol as in Example I of ethylene glycol monophenyl ether is substituted for the glycol ether of Example I as the chain terminator. This chain terminated polycarbonate resin has a stable melt at 340° C. This polymer has high thermal stability. The viscosity of this polymer after being held at 310° C. for 30 minutes is only slightly less than the initial viscosity.

*Example III*

To a solution of 230 grams of sodium hydroxide in 3 liters of water contained in a reactor are added with stirring 570 grams of 4,4'-isopropylidenediphenol and 2.5 liters of methylene chloride. The resulting liquid mixture is maintained at a temperature of between 26° C. and 27° C. The mixture is stirred vigorously and phosgene gas is fed into the reactor through a sintered glass tube situated below the liquid surface until the pH of the liquid drops to 7. To 0.1 part of the emulsion thus formed are added 1 mole percent, based on 0.1 the amount of 4,4'-isopropylidenediphenol previously added, of ethylene glycol monomethyl ether 9 grams of sodium hydroxide, and 75 milliliters of water. Stirring is continued mechanically overnight. The material separates into two layers. The supernatant water is decanted and methylene chloride is then volatilized by heating. The viscous mass thus obtained is put on a glass plate, air dried overnight and then further dried in a vacuum oven at a temperature of between 110° C. and 120° C. The product is a dense polymer having a molecular weight over 10,000, excellent thermal stability, and low melt viscosity. It can be fabricated into strong, tough films, filaments, and other shaped articles.

*Examples IV through VI*

The procedure of Example III is repeated using the same materials and proportions except that 2.5 mole percent based on the 4,4'-isopropylidenediphenol as in Example III of one of each of the following materials is substituted for the glycol ether of Example III: Example IV, tributylene glycol monocyclohexyl ether; Example V, propylene glycol monododecyl ether; Example VI, ethylene glycol monononyl ether. The products are high molecular weight polycarbonate resins of outstanding thermal stability and low melt viscosity. Shaped articles can be made easily from their melts by injection molding, extrusion, casting, and other standard techniques.

Similar excellent results are obtained using other chain terminators of this invention as above defined including those terminators specifically denominated.

The chain terminated polycarbonate resins of the present invention are characterized by high molecular weight, exceptional thermal stability and low melt viscosity. These resins are usually transparent and range from colorless to slightly tinted. They can be mixed with dyes, delusterants, pigments, plasticizers, reinforcing materials and with other polymers. They are easily fabricated into useful articles such as films, fibers, sheets, tubes, rods and the like from a melt or solution thereof by conventional shaping techniques such as molding, casting, and extruding. The resins can also be used to make laminates, such as safety glass and as protective or decorative coatings.

That which is claimed is:

1. A high molecular weight, thermally stable polycarbonate resin terminated with a glycol ether of the formula

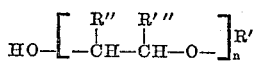

in which R' is a hydrocarbon radical having from 1 to 12 carbon atoms and is free of aliphatic unsaturation, R" and R''' are independently selected from the group consisting of H, methyl and ethyl, and the sum of carbon atoms in R" and R''' is from 0 to 2, and $n$ is a positive integer from 1 to 3.

2. A high molecular weight, thermally stable chain terminated polycarbonate resin according to claim 1 in which the glycol ether is ethylene glycol monomethyl ether.

3. A high molecular weight, thermally stable chain terminated polycarbonate resin, according to claim 1 in which the glycol ether is dipropylene glycol mono-n-butyl ether.

4. A chain terminated polycarbonate resin having recurring units of the structure

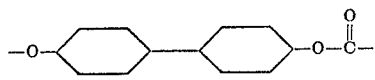

in which the hexagons represent benzene rings and B is selected from the group consisting of a divalent hydrocarbon radical, oxygen, and sulfonyl, the chain terminator having a structure of the formula

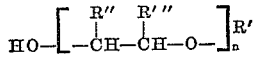

in which R' is a hydrocarbon radical having from 1 to 12 carbon atoms and is free of aliphatic unsaturation; R" and R'" are independently selected from the group consisting of H, methyl and ethyl, and the sum of the carbon atoms in R" and R'" is from 0 to 2, and $n$ is a positive integer from 1 to 3.

5. A chain terminated polycarbonate resin according to claim 4 in which the chain terminator is ethylene glycol monomethyl ether.

6. A chain terminated polycarbonate resin according to claim 4 in which the chain terminator is dipropylene glycol mono-n-butyl ether.

7. A chain terminated high molecular weight carbonate polymer having a structure of the formula

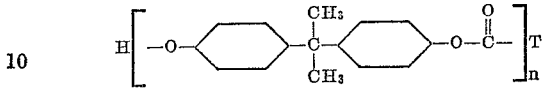

in which $n$ is an integer greater than 40 and T is a radical obtainable by removing the hydroxyl hydrogen from dipropylene glycol mono-n-butyl ether.

References Cited in the file of this patent
UNITED STATES PATENTS

| | | |
|---|---|---|
| 1,921,756 | Kienle | Aug. 8, 1933 |
| 2,889,312 | Szayna | June 2, 1959 |
| 2,950,266 | Goldblum | Aug. 23, 1960 |

UNITED STATES PATENT OFFICE
CERTIFICATE OF CORRECTION

Patent No. 3,080,342 — March 5, 1963

Lieng-Huang Lee et al.

It is hereby certified that error appears in the above numbered patent requiring correction and that the said Letters Patent should read as corrected below.

Column 2, lines 62 to 65 and column 5, lines 3 to 6, the formulae should appear as shown below instead of as in the patent:

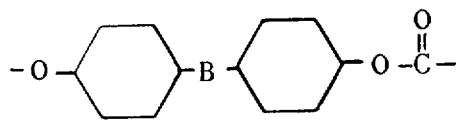

Signed and sealed this 8th day of October 1963.

(SEAL)
Attest:

ERNEST W. SWIDER
Attesting Officer

EDWIN L. REYNOLDS
Acting Commissioner of Patents